(12) United States Patent
Hasegawa

(10) Patent No.: US 10,690,949 B2
(45) Date of Patent: Jun. 23, 2020

(54) DISPLAY DEVICE

(71) Applicant: Sharp Kabushiki Kaisha, Sakai, Osaka (JP)

(72) Inventor: Takeshi Hasegawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/152,595

(22) Filed: Oct. 5, 2018

(65) Prior Publication Data
US 2019/0107743 A1    Apr. 11, 2019

(30) Foreign Application Priority Data
Oct. 10, 2017  (JP) .................. 2017-196857

(51) Int. Cl.
*G02F 1/1335* (2006.01)
*G02F 1/1333* (2006.01)

(52) U.S. Cl.
CPC ...... *G02F 1/1333* (2013.01); *G02F 1/133308* (2013.01); *G02F 1/133512* (2013.01); *G02F 1/133528* (2013.01); *G02F 2001/133354* (2013.01); *G02F 2201/50* (2013.01); *G02F 2201/56* (2013.01)

(58) Field of Classification Search
CPC ........ G02F 1/13; G02F 1/1333; G02F 1/1336; G02F 1/133602; G02F 1/1326; G02F 1/1335; G02F 1/133512; G02F 1/133524; G02F 1/133305; G02F 1/133362; G02F 1/133308; G02F 1/133528; G02F 1/133615; G02F 2001/133354; G02F 2201/56; G02F 2001/133322; G02F 2001/133541; G02F 2001/133314; G02F 2201/50
See application file for complete search history.

(56) References Cited

U.S. PATENT DOCUMENTS

2017/0168344 A1* 6/2017 Song ................. G02F 1/133308

FOREIGN PATENT DOCUMENTS

WO     2007/108244 A1    9/2007

\* cited by examiner

*Primary Examiner* — Thoi V Duong
(74) *Attorney, Agent, or Firm* — Keating & Bennett, LLP

(57) ABSTRACT

A display device includes a display panel displaying an image thereon and having a plate surface and including a panel alignment mark on the plate surface of the display panel, a polarizing plate disposed overlapping the plate surface and including a polarizing plate alignment mark, and a component disposed overlapping the plate surface and the polarizing plate and including a component alignment mark. The display panel, the polarizing plate, and the component have a non-quadrangular outline shape, a mounting position of the polarizing plate with respect to the display panel is determined according to position relation of the polarizing plate alignment mark and the panel alignment mark, and a mounting position of the component with respect to the display panel is determined according to position relation of the component alignment mark and the panel alignment mark.

11 Claims, 14 Drawing Sheets

DISPLAY DEVICE

CROSS REFERENCE TO RELATED APPLICATION

This application claims priority from Japanese Patent Application No. 2017-196857 filed on Oct. 10, 2017. The entire contents of the priority application are incorporated herein by reference.

TECHNICAL FIELD

The technology described herein relates to a display device.

BACKGROUND

A liquid crystal display device includes a liquid crystal display panel and a polarizing plate and at least one of the liquid crystal display panel and the polarizing plate has a deformed planar shape that is not a quadrangular shape. The polarizing plate has a first alignment mark and an alignment film has a second alignment mark as bonding marks. The alignment film and the polarizing plate are positioned each other according to the first and the second alignment marks and bonded to each other. Such a liquid crystal display panel included in the liquid crystal display device is described in WO 2007/108244.

Components such as the backlight device that supplies light to the liquid crystal display panel having a deformed shape other than the quadrangular shape also has a deformed shape other than the quadrangular shape similar to the liquid crystal display panel. Therefore, if the backlight device that is mounted on the liquid crystal panel is shifted from a correct position, use efficiency of light supplied by the backlight device may be lowered.

SUMMARY

The technology disclosed herein was made in view of the above circumstances. An object is to improve alignment accuracy of a component with respect to a display panel.

A display device according to the present technology includes a display panel displaying an image thereon and having a plate surface and including a panel alignment mark on the plate surface of the display panel, a polarizing plate disposed overlapping the plate surface and including a polarizing plate alignment mark, and a component disposed overlapping the plate surface and the polarizing plate and including a component alignment mark. The display panel, the polarizing plate, and the component have a non-quadrangular outline shape, a mounting position of the polarizing plate with respect to the display panel is determined according to position relation of the polarizing plate alignment mark and the panel alignment mark, and amounting position of the component with respect to the display panel is determined according to position relation of the component alignment mark and the panel alignment mark.

According to such a configuration, when the polarizing plate is mounted on the plate surface of the display panel, the mounting position of the polarizing plate with respect to the display panel can be determined based on the position relation of the panel alignment mark included in the plate surface of the display panel and the polarizing plate alignment mark included in the polarizing plate. Therefore, even if the outline of the display panel and the polarizing plate is non-quadrangular, the polarizing plate can be mounted on the display panel in a proper position. Accordingly, the alignment accuracy of the polarizing plate with respect to the display panel is improved.

When the component is mounted on the plate surface of the display panel, the mounting position of the component with respect to the display panel can be determined based on the position relation of the panel alignment mark of the display panel and the component alignment mark of the component. Therefore, even if the outline of the display panel and the component is non-quadrangular, the component can be mounted on the display panel in a proper position. Accordingly, the alignment accuracy of the component with respect to the display panel is improved. Thus, the component can be aligned with respect to the display panel with using the panel alignment mark for aligning the polarizing plate with respect to the display panel. Therefore, compared to a configuration of the display panel including an alignment mark for the polarizing plate and an alignment mark for a component independently from each other, the display panel has a smaller arrangement space for the panel alignment mark and the panel alignment mark is less likely to affect an outer appearance or the display quality.

According to the technology described herein, alignment accuracy of a component with respect to a display panel is improved.

DETAILED DESCRIPTION

First Embodiment

Figure 1:
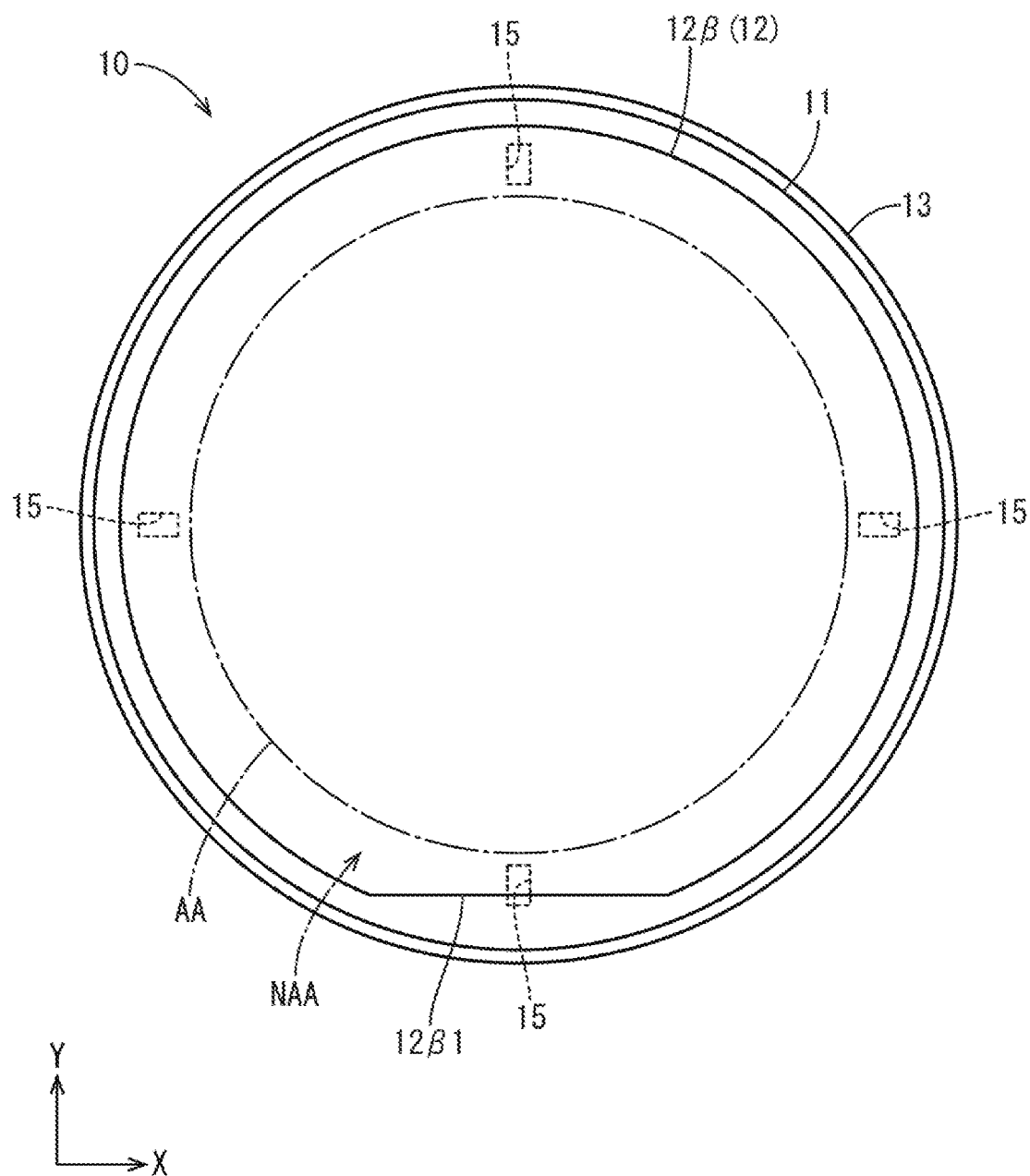
FIG. 1 is a plan view of a liquid crystal display device according to a first embodiment.
Figure 2:
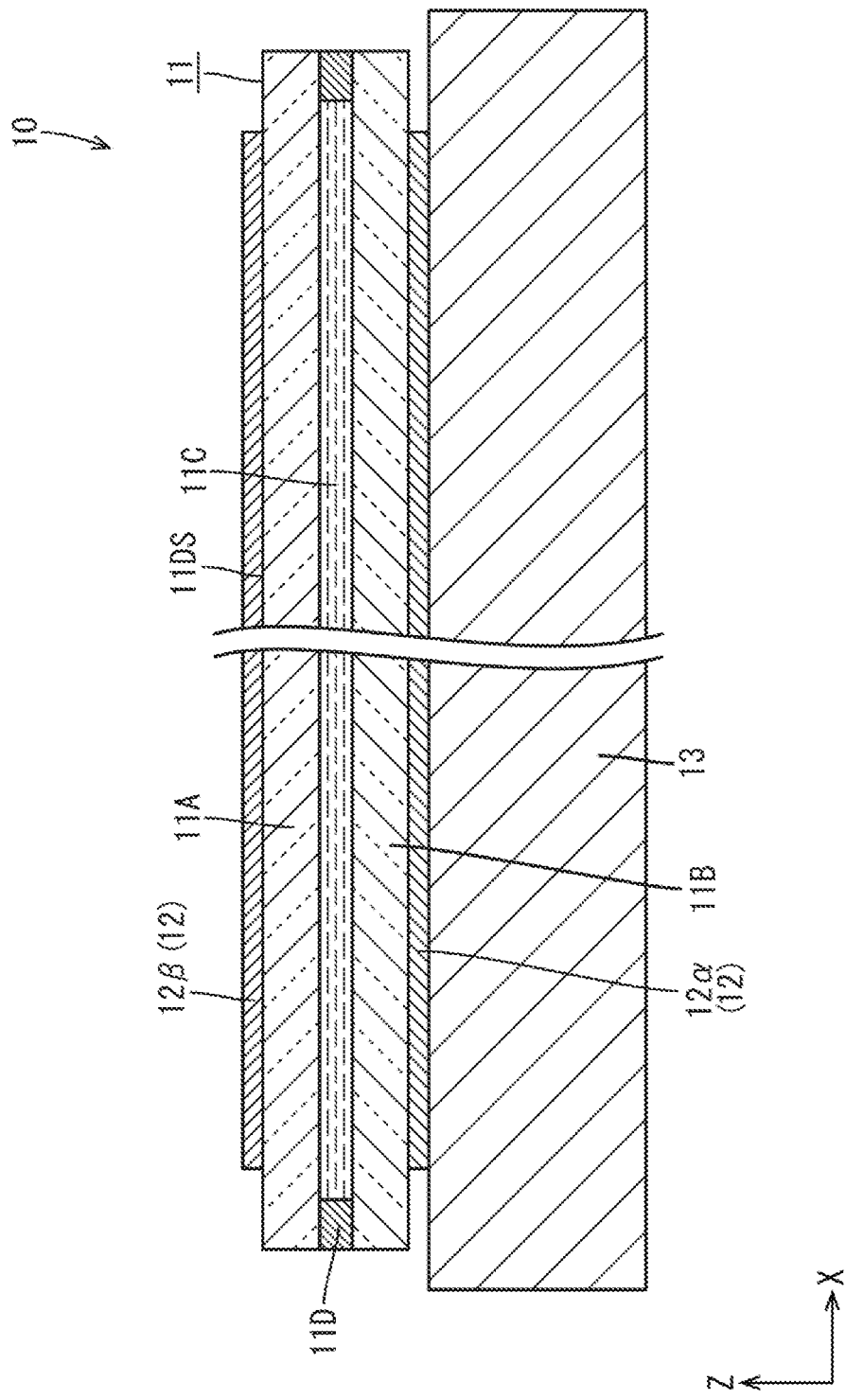
FIG. 2 is a cross-sectional view of the liquid crystal display device.

A first embodiment will be described with reference to FIGS. 1 to 10. In the present embodiment, a liquid crystal display device (a display device) 10 will be described. X-axis, Y-axis and Z-axis may be indicated in the drawings. The axes in each drawing correspond to the respective axes in other drawings. A vertical direction in FIG. 2 is a reference vertical direction and an upper side and a lower side in FIG. 2 are a front side and a rear side, respectively. FIG. 1 is a plan view of the liquid crystal display device 10. As illustrated in FIG. 1, the liquid crystal display device 10 has a substantially circular shape (a non-quadrangular shape) as a whole. FIG. 2 is a cross-sectional view of the liquid crystal display device 10. As illustrated in FIG. 2, the liquid crystal display device 10 includes a transmissive liquid crystal panel (a display panel) 11 for displaying images thereon. The liquid crystal display device 10 includes a pair of polarizing plates 12 that are bonded to front and rear plate surfaces of the liquid crystal panel 11, respectively. The liquid crystal display device 10 includes a backlight device (a lighting device, a component) 13 arranged on a rear side with respect to the liquid crystal panel 11 and providing light toward the liquid crystal panel 11 for displaying images thereon. The liquid crystal display device 10 is preferably used in a wearable terminal such as a smart watch (not illustrated). However, it is not limited thereto.

Figure 3:
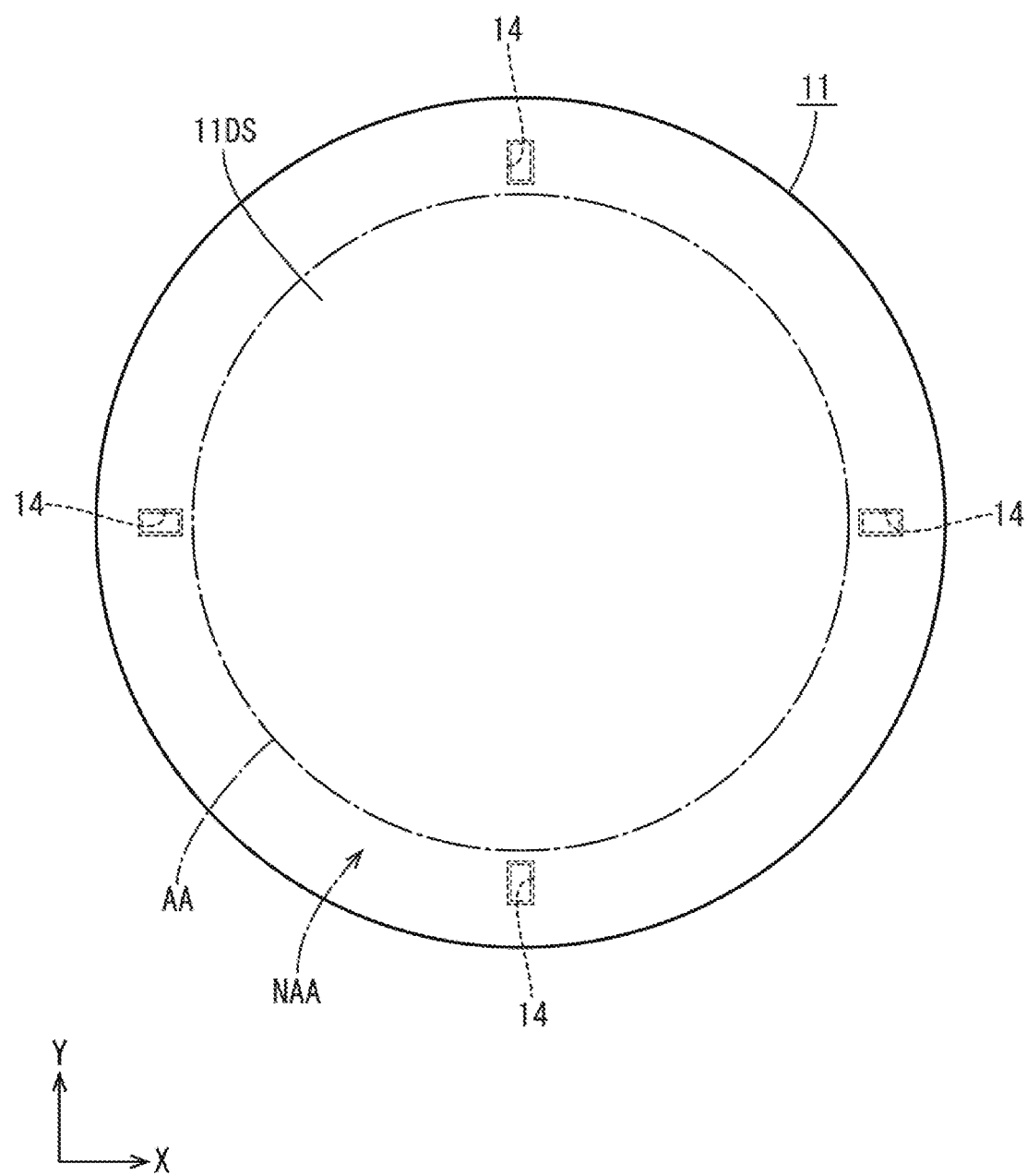
FIG. 3 is a plan view of a liquid crystal panel included in the liquid crystal display device.

The liquid crystal panel 11 will be described. As illustrated in FIG. 2, the liquid crystal panel 11 includes a pair of glass substrates 11A, 11B that are substantially transparent and have highly transmissivity. The liquid crystal panel 11 includes a liquid crystal layer 11C between the substrates 11A and 11B and including liquid crystal molecules that change optical properties thereof according to application of electric field. The liquid crystal panel 11 includes a sealing member 11D that surrounds and seals the liquid crystal layer 11C. One of the substrates 11A, 11B on the front (a front-surface side) is a CF substrate 11A and the other one of the substrates 11A, 11B on the rear (a rear-surface side) is an array substrate 11B. The CF substrate 11A on the front has an outer plate surface that is a display surface 11DS on which images appear. FIG. 3 is a plan view of the liquid crystal panel 11. As illustrated in FIG. 3, the liquid crystal panel 11 has a substantially circular plan view outline shape (non-quadrangular shape) and has a display section AA of substantially a circular shape in a central area. The liquid crystal panel 11 includes a non-display section NAA that is substantially annular and surrounds the display section AA. No images appear in the non-display section NAA. The non-display section NAA includes an outer edge portion of the liquid crystal panel 11. In FIGS. 1 and 3, a border between the display section AA and the non-display section NAA is illustrated with a one-dotted chain line.

Next, an internal structure of the display section AA included in the liquid crystal panel 11 will be briefly described and each of the components included in the internal structure is not illustrated in the drawings. Thin film transistors (TFTs) that are switching components and pixel electrodes are arranged in a matrix (rows and columns) on an inner surface of the array substrate 11B. Gate lines and source lines are arranged in a matrix around the TFTs and the pixel electrodes on the inner surface of the array substrate 11B. Signals relating images are supplied to the gate lines and the source lines. The pixel electrodes that are disposed in areas surrounded by the gate lines and the source lines are formed from transparent electrode material. On the array substrate 11B, metal films forming various kinds of lines, a transparent electrode film forming the pixel electrodes, and insulation film for establishing insulation between the metal films and the transparent electrode film are layered and the films are subjected to patterning with the photolithography method. On an inner surface of the CF substrate 11A, color filters are formed on an inner surface side of the CF substrate 11A corresponding with the respective pixel electrodes. The color filters include red (R), green (G), and blue (B) color filters that are arranged alternately. A light blocking section (a black matrix) is formed on the inner surface side of the CF substrate 11A between the adjacent color filters for reducing color mixture. The light blocking section is arranged to define each of the adjacent color filters in the display section AA and is formed in a solid pattern in the non-display section NAA. A counter electrode that is formed from the transparent electrode material is disposed on the inner surface side of the CF substrate 11A opposite the pixel electrodes. On the CF substrate 11A, various films for the color filters and the light blocking section are formed with patterning with the photolithography method similar to the array substrate 11B. Alignment films are provided on inner surfaces of the substrates 11A, 11B, respectively, to align the liquid crystal molecules in the liquid crystal layer 11C. The alignment film is made of polyimide, for example, and is formed in a solid on the inner surface of each substrate 11A, 11B.

Next, the polarizing plate 12 will be described. The polarizing plate 12 is formed from a film having a plate surface parallel to a plate surface of the liquid crystal panel 11 (see FIG. 2). In the following, each of layers included in the polarizing plate 12 will be described and is not illustrated in the drawings. The polarizing plate 12 includes a polarizing layer that generates polarized light directly from natural light. The polarizing layer is formed as follows. A polarizer is obtained by mixing an absorber such as iodine or dichromatic dye into a high polymer resin film such as polyvinyl alcohol (PVA) film and stretching the mixture in one direction to align the absorber. The polarizer is sandwiched between protection films such as triacetylcellulose (TAC) films and the polarizing layer is obtained. The polarizing plate 12 including the polarizing layer formed by uniaxial stretching as described above has a transmission axis (polarization axis) and an absorption axis perpendicular to the transmission axis to convert circularly polarized light into linearly polarized light. The polarizing plate 12 further includes a laminator layer (a protection layer) that is disposed on an outer surface (opposite side from the liquid crystal panel 11 side) and protects the polarizing layer and a fixation layer that is disposed on an inner surface (on the liquid crystal panel 11 side) and fixed to an outer surface of the liquid crystal panel 11. The fixation layer is formed from adhesive material that is disposed on an inner surface of the polarizing layer with coating. The specific configuration of the polarizing plate 12 is not limited to the foregoing one, but may be altered as appropriate such as adding a retarder, for example. A pair of polarizing plates 12 having such a configuration is attached to the front and back outer surfaces of the liquid crystal panel 11, respectively. The pair of polarizing plates 12 is arranged such that their transmission axes (absorption axes) are perpendicular to each other, namely, is in a crossed nicols arrangement. According to the crossed nicols arrangement, the liquid crystal panel 11 is in normally black mode in which the liquid crystal panel 11 displays black with minimum transmittance at the de-energized time (when no voltage is applied to the pixel electrodes). Hereinafter, the pair of polarizing plates 12 includes a first polarizing plate (one polarizing plate) 12α that is arranged on the back side of the liquid crystal panel 11 (opposite from a display surface 11DS side) and a second polarizing plate (another polarizing plate) 12β that is arranged on the front side of the liquid crystal panel 11 (the display surface 11DS side).

Figure 4:
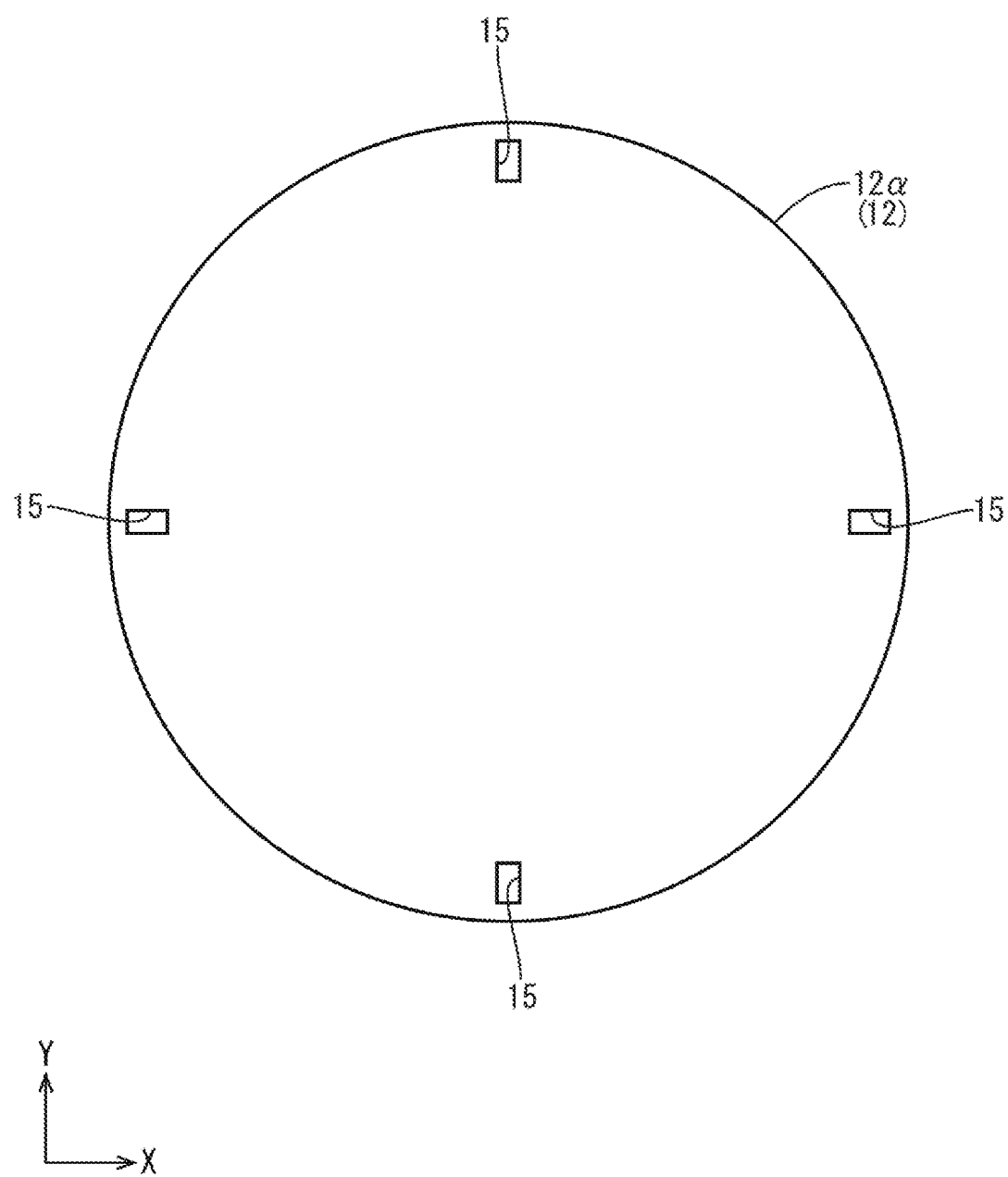
FIG. 4 is a plan view illustrating a first polarizing plate of a pair of polarizing plates included in the liquid crystal display device.
Figure 5:
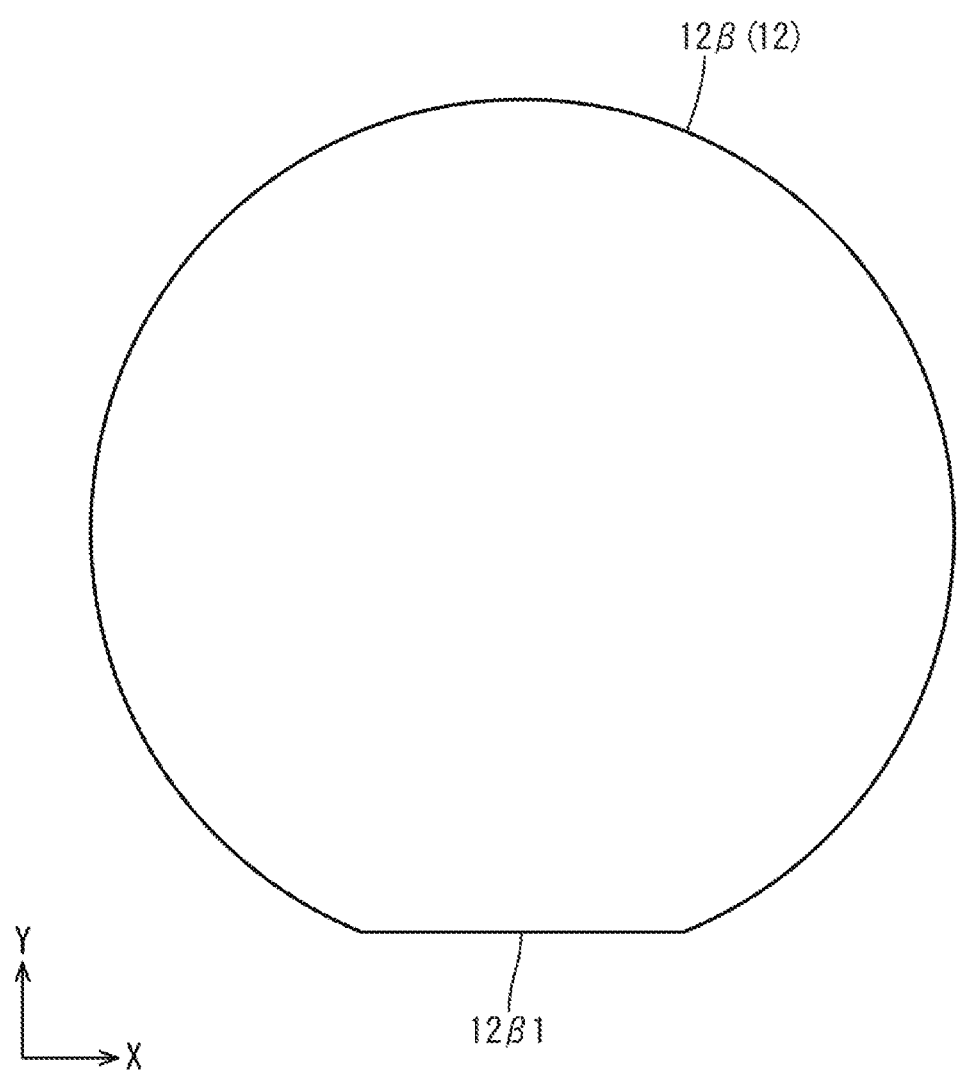
FIG. 5 is a plan view illustrating a second polarizing plate of the pair of polarizing plates.

FIG. 4 is a plan view of the first polarizing plate 12α. As illustrated in FIG. 4, the first polarizing plate 12α of a pair of polarizing plates 12 has a substantially circular (non-quadrangular shape) outline shape similar to the liquid crystal panel 11 and has a rotation symmetrical shape. FIG. 5 is a plan view of a second polarizing plate 12β. As illustrated in FIG. 5, the second polarizing plate 12β has a circular plan-view shape a part of which is cut off (a non-quadrangular shape). Specifically, a lower end portion of the second polarizing plate 12β is cut off along a straight line as illustrated in FIG. 5 and the second polarizing plate 12β has a linear outline section 12β1 of a straight line along the X-axis direction. Therefore, the second polarizing plate 12β has a non-rotation symmetrical shape. According to such a configuration, when the second polarizing plate 12β is mounted on the liquid crystal panel 11, the second polarizing plate 12β can be mounted in a proper mounting position with respect to the liquid crystal panel 11 by using the outline shape (the linear outline section 12β1) of the second polarizing plate 12β.

Figure 6:
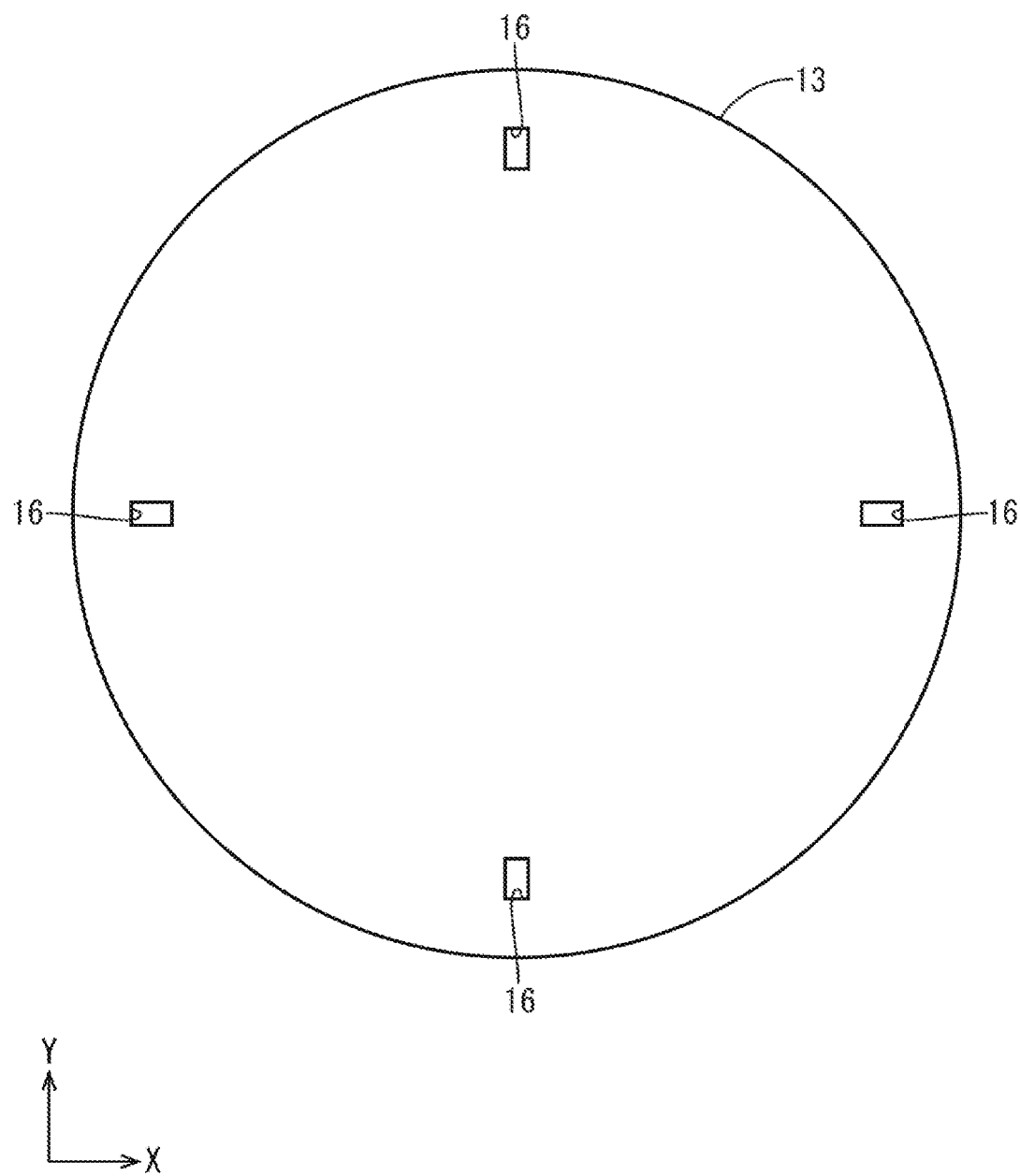
FIG. 6 is a plan view of a backlight unit included in the liquid crystal display device.

Next, the backlight unit 13 will be described. FIG. 6 is a plan view of the backlight unit 13. As illustrated in FIG. 6, the backlight unit 13 has a substantially circular plan-view outline shape (a non-quadrangular shape) similar to the liquid crystal panel 11. As is not illustrated, the backlight unit 13 at least includes a light source (such as LEDs and organic ELs), an optical member through which light from the light source transmits and that applies an optical action to the transmitted light, and a reflection sheet that reflects light toward the liquid crystal panel 11. The optical member includes a light guide plate and an optical sheet. The light guide plate is disposed on the front side with respect to the reflection sheet and guides the light from the light source and the light exits the light guide plate as a planar light. The optical sheet is disposed on the front side with respect to the light guide plate and applies a light collecting action or a light diffusing action to the light rays exiting the light guide plate. The optical sheet includes a light collecting sheet exerting a light collecting action as an optical action and a light diffusing sheet exerting a light diffusing action as an optical action. The light collecting sheet includes a prism sheet that applies the light collecting action in a specific direction. The backlight unit 13 is not directly mounted on a back-side plate surface of the liquid crystal panel 11 but is indirectly mounted on the liquid crystal panel 11 having the first polarizing plate 12α therebetween (see FIG. 2). The backlight unit 13 is fixed to the liquid crystal panel 11 and the first polarizing plate 12α with an optical clear adhesive (OCA) film. The backlight unit 13 has an outline that is slightly greater than that of the liquid crystal panel 11 (see FIG. 1).

When the polarizing plate 12 is bonded to the liquid crystal panel 11, the polarizing plate 12 is necessary to be positioned with respect to the liquid crystal panel 11 such that the polarization axis or the transmission axis of the polarizing plate 12 matches the alignment axis of the alignment film of the liquid crystal panel 11. If the polarization axis or the transmission axis of the polarizing plate 12 does not match the alignment axis of the alignment film, the light leaking is likely to be caused even in the black display. Therefore, contrast properties may be deteriorated. If the backlight unit 13 is mounted on the liquid crystal panel 11 while being shifted in the X-axis direction and the Y-axis direction, which are perpendicular to each other, with respect to the liquid crystal panel 11 along a plate surface of the liquid crystal panel 11, some of the light rays emitted by the backlight unit 13 may not enter the liquid crystal panel 11 and leak to the outside. If the backlight unit 13 is mounted on the liquid crystal panel 11 while being shifted and rotated in a rotation direction around a center of the plate surface of the liquid crystal panel 11 along the plate surface, the light collecting direction of the prism sheet included in the backlight unit 13 does not match the alignment axis of the alignment film or the polarization axis of the polarizing plate 12. Accordingly, moire stripes (moire) may be caused by influence of the light rays that enter the liquid crystal panel 11.

According to this embodiment, the liquid crystal panel 11, the first polarizing plate 12α, and the backlight unit 13 include a panel alignment mark 14, a polarizing plate alignment mark 15, and a backlight alignment mark (a component alignment mark) 16, respectively, to align properly the first polarizing plate 12α and the backlight unit 13 with respect to the liquid crystal panel 11. As illustrated inn FIG. 3, the panel alignment marks 14 are formed within a plate surface of the liquid crystal panel 11. The panel alignment marks 14 are disposed in the non-display section NAA of the liquid crystal panel 11 and closer to an outer edge than a center of the liquid crystal panel 11. Four panel alignment marks 14 are disposed at an angular interval of about 90°. Each of the panel alignment marks 14 has a rectangular plan-view frame shape. The panel alignment marks 14 are included in each of the pair of substrates 11A, 11B of the liquid crystal panel 11 (see FIG. 2). The panel alignment marks 14 on the CF substrate 11A side are formed by forming holes in a part of the light blocking section disposed in the non-display section NAA. The panel alignment marks 14 on the array substrate 11B side are formed by forming openings (holes) in a part of the insulation film disposed in the non-display section NAA.

As illustrated in FIG. 4, the polarizing plate alignment marks 15 are formed on a plate surface of the first polarizing plate 12α. The polarizing plate alignment marks 15 overlap the non-display section NAA and are closer to an outer edge than a center of the first polarizing plate 12α. Four polarizing plate alignment marks 15 are disposed at an angular interval of about 90°. Each of the polarizing plate alignment marks 15 has a rectangular plan-view shape and has an outer dimension thereof that is substantially same as an outer dimension of the panel alignment mark 14. When the first polarizing plate 12α is mounted on the liquid crystal panel 11, the mounting position of the first polarizing plate 12α with respect to the liquid crystal panel 11 can be determined based on the position relation of the polarizing plate alignment marks 15 with respect to the panel alignment marks 14.

As illustrated in FIG. 6, the backlight alignment marks 16 are included in the optical member (the light guide plate or the optical sheet) included in the backlight unit 13. The backlight alignment mark is formed by forming openings (holes) in the plate surface of the optical member. The backlight alignment marks 16 overlap the non-display section NAA and are closer to an outer edge than a center of the backlight unit 13. Four backlight alignment marks 16 are disposed at an angular interval of about 90°. Each of the backlight alignment marks 16 has a rectangular plan-view shape and has an outer dimension thereof that is substantially same as the outer dimension of the panel alignment mark 14 and the outer dimension of the polarizing plate alignment mark 15. When the backlight unit 13 is mounted on the liquid crystal panel 11, the mounting position of the backlight unit 13 with respect to the liquid crystal panel 11 can be determined based on the position relation of the backlight alignment marks 16 with respect to the panel alignment marks 14.

Figure 7:
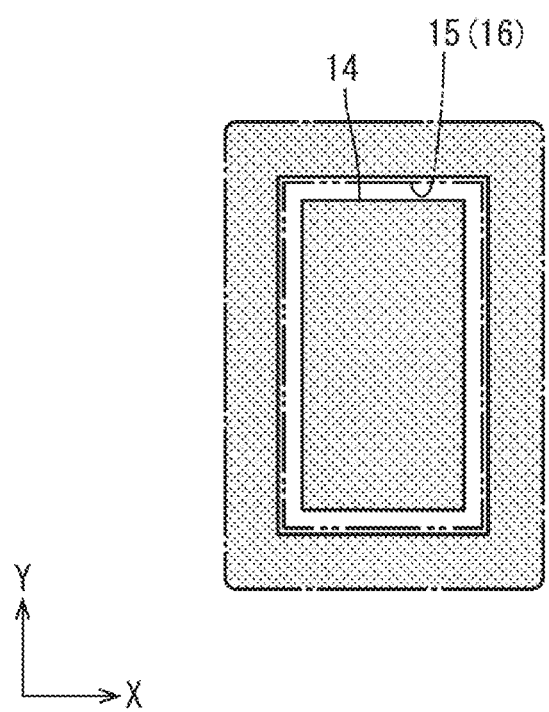
FIG. 7 is a plan view illustrating a panel alignment mark, a polarizing plate alignment mark, and a backlight alignment mark that match each other.
Figure 8:
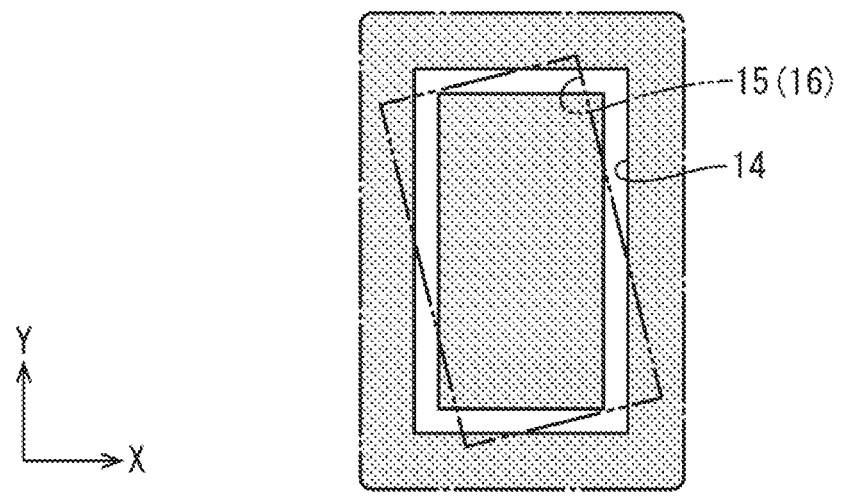
FIG. 8 is a plan view illustrating the panel alignment mark, the polarizing plate alignment mark, and the backlight alignment mark that do not match in a rotation direction.
Figure 9:
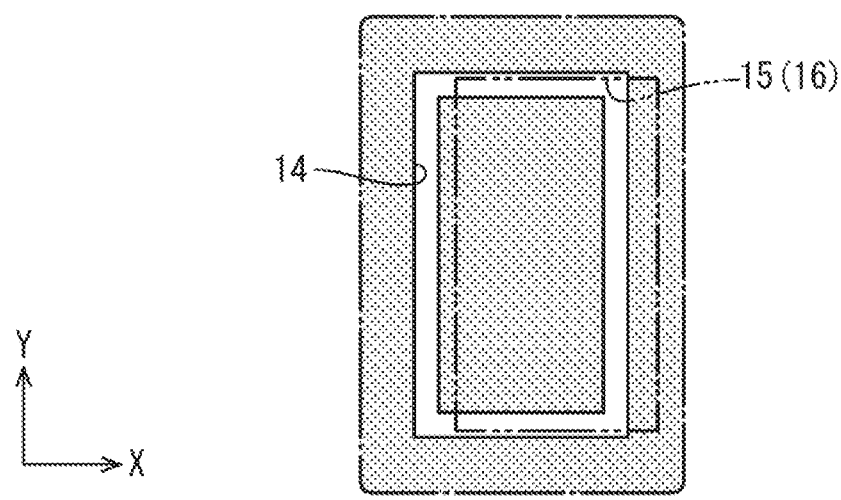
FIG. 9 is a plan view illustrating the panel alignment mark, the polarizing plate alignment mark, and the backlight alignment mark that do not match in an X-axis direction.
Figure 10:
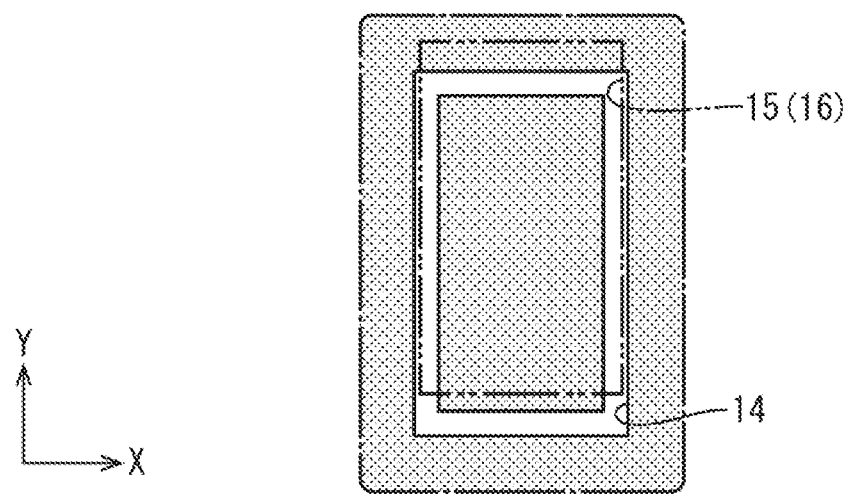
FIG. 10 is a plan view illustrating the panel alignment mark, the polarizing plate alignment mark, and the backlight alignment mark that do not match in a Y-axis direction.

The present embodiment has the above-described structure and operations thereof will be described below. The liquid crystal panel 11, the polarizing plate 12, and the backlight unit 13 that are manufactured separately are mounted to each other and the liquid crystal display device 10 is produced. Hereinafter, the mounting operation of the polarizing plate 12 and the backlight unit 13 will be described with reference to FIGS. 7 to 10. FIG. 7 is a plan view illustrating that the panel alignment mark 14 matches the polarizing plate alignment mark 15 and the backlight alignment mark 16. FIG. 8 is a plan view illustrating that the panel alignment mark 14 does not match the polarizing plate alignment mark 15 and the backlight alignment mark 16 in the rotation direction. FIG. 9 is a plan view illustrating that the panel alignment mark 14 does not match the polarizing plate alignment mark 15 and the backlight alignment mark 16 in the X-axis direction. FIG. 10 is a plan view illustrating that the panel alignment mark 14 does not match the polarizing plate alignment mark 15 and the backlight alignment mark 16 in the Y-axis direction. In FIGS. 7 to 10, the polarizing plate alignment mark 15 and the backlight alignment mark 16 are illustrated with the same two-dotted chain line. In FIGS. 7 to 10, a section of the liquid crystal panel 11 where the panel alignment mark 14 is not formed (a light blocking area where the light blocking section remains) is illustrated with shading.

Amounting operation of the pair of polarizing plates 12 will be described. The polarizing plates 12 are mounted on the front and back plate surfaces of the liquid crystal panel 11, respectively. When the second polarizing plate 12β having the non-rotation symmetrical shape illustrated in FIG. 5 is mounted on the liquid crystal panel 11, the second polarizing plate 12β can be mounted in a proper mounting position with respect to the liquid crystal panel 11 by using the outline shape (the linear outline section 12β1) of the second polarizing plate 12β. When the first polarizing plate 12α having the rotation symmetrical shape illustrated in FIG. 4 is mounted on the liquid crystal panel 11, the mounting position of the first polarizing plate 12α with respect to the liquid crystal panel 11 can be determined based on the position relation of the polarizing plate alignment marks 15 included in the plate surface of the first polarizing plate 12α with respect to the panel alignment marks 14 included in the plate surface of the liquid crystal panel 11. For example, as illustrated in FIG. 7, if the outline (sections along the X-axis direction and sections along the Y-axis direction) of the panel alignment mark 14 substantially matches and is parallel to the outline of the polarizing plate alignment mark 15, it is determined that the mounting position of the first polarizing plate 12α with respect to the liquid crystal panel 11 is normal. On the other hand, as illustrated in FIGS. 9 and 10, if the outline of the polarizing plate alignment mark 15 does not match and is shifted from the outline of the panel alignment mark 14 with respect to the X-axis direction or the Y-axis direction, it is determined that the mounting position of the first polarizing plate 12α with respect to the liquid crystal panel 11 is shifted in the X-axis direction or the Y-axis direction. Furthermore, as illustrated in FIG. 8, if the outline of the polarizing plate alignment mark 15 does not match and is shifted from the outline of the panel alignment mark 14 with respect to the rotation direction, it is determined that the mounting position of the first polarizing plate 12α with respect to the liquid crystal panel 11 is shifted in the rotation direction. Accordingly, the first polarizing plate 12α can be aligned with respect to the liquid crystal panel 11 such that the mounting position of the first polarizing plate 12α with respect to the liquid crystal panel 11 is proper based on the position relation of the polarizing plate alignment mark 15 with respect to the panel alignment mark 14. Therefore, the alignment accuracy of the first polarizing plate 12α with respect to the liquid crystal panel 11 is improved.

Next, a mounting operation of the backlight unit 13 will be described. The backlight unit 13 is mounted on a back plate surface side of the first polarizing plate 12α and the liquid crystal panel 11 while overlapping the first polarizing plate 12α and the liquid crystal panel 11. When the backlight unit 13 having the rotation symmetrical shape illustrated in FIG. 6 is mounted on the liquid crystal panel 11, the mounting position of the backlight unit 13 with respect to the liquid crystal panel 11 can be determined based on the position relation of the backlight alignment mark 16 included in the plate surface of the optical member of the backlight unit 13 with respect to the panel alignment mark 14 included in the plate surface of the liquid crystal panel 11. For example, as illustrated in FIG. 7, if the outline of the panel alignment mark 14 substantially matches the outline of the backlight alignment mark 16 and are parallel to each other, it is determined that the mounting position of the backlight unit 13 with respect to the liquid crystal panel 11 is normal. On the other hand, as illustrated in FIG. 8, if the outline of the backlight alignment mark 16 does not match the outline of the panel alignment mark 14 with respect to the rotation direction, it is determined that the mounting position of the backlight unit 13 with respect to the liquid crystal panel 11 is shifted in the rotation direction. Furthermore, as illustrated in FIGS. 9 and 10, if the outline of the backlight alignment mark 16 does not match the outline of the panel alignment mark 14 with respect to the X-axis direction or the Y-axis direction, it is determined that the mounting position of the backlight unit 13 with respect to the liquid crystal panel 11 is shifted in the X-axis direction or the Y-axis direction. Accordingly, the backlight unit 13 can be aligned with respect to the liquid crystal panel 11 such that the mounting position of the backlight unit 13 with respect to the liquid crystal panel 11 is proper based on the position relation of the backlight alignment mark 16 with respect to the panel alignment mark 14. Therefore, the alignment accuracy of the backlight unit 13 with respect to the liquid crystal panel 11 is improved. Specifically, the alignment accuracy of the backlight unit 13 with respect to the liquid crystal panel 11 along the plate surface of the liquid crystal panel 11 and in the X-axis direction and the Y-axis direction, which are perpendicular to each other, is improved. Accordingly, the light rays supplied by the backlight unit 13 toward the liquid crystal panel 11 are less likely to leak and lowering of brightness is less likely to be caused. The alignment accuracy of the backlight unit 13 with respect to the liquid crystal panel 11 along the plate surface of the liquid crystal panel 11 and in the rotation direction is improved. Accordingly, even if the light rays supplied by the backlight unit 13 toward the liquid crystal panel 11 are directed at a certain angle with the prism sheet, the moire stripes are less likely to be caused due to the light rays entering the liquid crystal panel 11 and display errors are less likely to be caused.

As described before, the backlight unit 13, which is the component, is aligned with respect to the liquid crystal panel 11 with using the panel alignment mark 14 that is used for aligning the polarizing plate 12 with respect to the liquid crystal panel 11. Therefore, compared to a configuration of the liquid crystal panel 11 including an alignment mark for the polarizing plate and an alignment mark for a backlight unit, which is the component, independently from each other, the liquid crystal panel 11 has a smaller arrangement space for the panel alignment mark 14 and the panel alignment mark 14 is less likely to affect an outer appearance or the display quality. Furthermore, each of the substrates 11A, 11B included in the liquid crystal panel 11 includes the panel alignment marks 14 and therefore, the alignment accuracy is further improved. Since the first polarizing plate 12α including the polarizing plate alignment marks 15 is disposed on the back side with respect to the liquid crystal panel 11, the polarizing plate alignment marks 15 are less likely to be seen by a user and the outer appearance and the display quality are improved. Further, the alignment marks 14, 15, 16 are included closer to the outer edge than a center of the liquid crystal display device 10. Therefore, the alignment accuracy is further improved.

As described before, in the liquid crystal display device (the display device) 10 of this embodiment, the polarizing plate 12 and the backlight unit 13, which is the component, are mounted on the plate surface of the liquid crystal panel (the display panel) 11. The liquid crystal panel 11, the polarizing plate 12, and the backlight unit 13, which is the component, have a non-quadrangular outline shape. The liquid crystal display device 10 includes the panel alignment marks 14 included in a plate surface of the liquid crystal panel 11, the polarizing plate alignment marks 15 included in the polarizing plate 12 for determining the mounting position of the polarizing plate 12 with respect to the liquid crystal panel 11 based on position relation of the polarizing plate alignment marks 15 and the panel alignment marks 14, and the backlight alignment marks (component alignment marks) 16 included in the backlight unit 13, which is the component, for determining the mounting position of the backlight unit 13, which is the component, with respect to the liquid crystal panel 11 based on position relation of the backlight alignment marks 16 and the panel alignment marks 14.

According to such a configuration, when the polarizing plate 12 is mounted on the plate surface of the liquid crystal panel 11, the mounting position of the polarizing plate 12 with respect to the liquid crystal panel 11 can be determined based on the position relation of the panel alignment marks 14 included in the plate surface of the liquid crystal panel 11 and the polarizing plate alignment marks 15 included in the polarizing plate 12. Therefore, even if the outline of the liquid crystal panel 11 and the polarizing plate 12 is non-quadrangular, the polarizing plate 12 can be mounted on the liquid crystal panel 11 in a proper position. Accordingly, the alignment accuracy of the polarizing plate 12 with respect to the liquid crystal panel 11 is improved.

When the backlight unit 13, which is the component, is mounted on the plate surface of the liquid crystal panel 11, the mounting position of the backlight unit 13 with respect to the liquid crystal panel 11 can be determined based on the position relation of the panel alignment marks 14 of the liquid crystal panel 11 and the backlight alignment marks 16 of the backlight unit 13, which is the component. Therefore, even if the outline of the liquid crystal panel 11 and the backlight unit 13, which is the component, is non-quadrangular, the backlight unit 13, which is the component, can be mounted on the liquid crystal panel 11 in a proper position. Accordingly, the alignment accuracy of the backlight unit 13, which is the component, with respect to the liquid crystal panel 11 is improved. Thus, the backlight unit 13, which is the component, can be aligned with respect to the liquid crystal panel 11 with using the panel alignment mark 14 for aligning the polarizing plate 12 with respect to the liquid crystal panel 11. Therefore, compared to a configuration of the liquid crystal panel 11 including an alignment mark for the polarizing plate and an alignment mark for a backlight unit, which is the component, independently from each other, the liquid crystal panel 11 has a smaller arrangement space for the panel alignment mark 14 and the panel alignment mark 14 is less likely to affect an outer appearance or the display quality.

The component at least includes the backlight unit (a lighting unit) 13 that supplies light to the liquid crystal panel 11 for display. The mounting position of the backlight unit 13 with respect to the liquid crystal panel 11 can be determined based on the position relation of the backlight alignment marks 16 with respect to the panel alignment marks 14. Accordingly, the alignment accuracy of the backlight unit 13 with respect to the liquid crystal panel 11 along the plate surface of the liquid crystal panel 11 and in the X-axis direction and the Y-axis direction, which are perpendicular to each other, is improved. Accordingly, the light rays supplied by the backlight unit 13 toward the liquid crystal panel 11 are less likely to leak and lowering of brightness is less likely to be caused. Furthermore, the alignment accuracy of the backlight unit 13 with respect to the liquid crystal panel 11 along the plate surface of the liquid crystal panel 11 and in the rotation direction is improved. Accordingly, even if the light rays supplied by the backlight unit 13 toward the liquid crystal panel 11 are directed at a certain angle, the moire stripes are less likely to be caused due to the light rays entering the liquid crystal panel 11 and display errors are less likely to be caused.

The backlight unit 13 at least includes the light source and the optical member that has a plate surface parallel to the plate surface of the liquid crystal panel 11 and applies the optical action to the light rays emitted by the light source. The backlight unit 13 includes the backlight alignment marks 16 that are openings in the plate surface of the optical member. According to such a configuration, a predetermined optical action is applied by the optical member to the light rays emitted by the light source and the light rays are supplied to the liquid crystal panel 11. The optical member included in the backlight unit 13 includes the backlight alignment marks 16 that are openings in the plate surface of the optical member. If the backlight unit 13 includes a reflection sheet, which is a light blocking member, and the backlight alignment marks 16 that are openings in the reflection sheet of the light blocking member, the light rays may leak. Compared to such a configuration, the light leaking is less likely to be caused.

The liquid crystal panel 11 includes a pair of the substrates 11A, 11B that are bonded to each other and the panel alignment marks 14 are included in each of the substrates 11A, 11B. According to such a configuration including the panel alignment marks 14 in each of the substrates 11A, 11B, the alignment accuracy is further improved.

The polarizing plate 12 includes a pair of polarizing plates sandwiching the liquid crystal panel 11 therebetween. The first polarizing plate 12α (one polarizing plate) of the pair of polarizing plates 12 includes the polarizing plate alignment marks 15 and the second polarizing plate 12β (another polarizing plate) has a non-quadrangular shape and a non-rotation symmetrical shape. According to such a configuration, when the first polarizing plate 12α is mounted on the liquid crystal panel 11, the mounting position of the first polarizing plate 12α with respect to the liquid crystal panel 11 can be determined based on the position relation of the panel alignment marks 14 and the polarizing plate alignment marks 15. When the second polarizing plate 12β is mounted on the liquid crystal panel 11, the second polarizing plate 12β can be mounted in a proper mounting position with respect to the liquid crystal panel 11 by using the non-quadrangular and non-rotational symmetrical outline shape of the second polarizing plate 12β.

The liquid crystal panel 11 has a plate surface that is the display surface 11DS on which images appear and the first polarizing plate 12α is disposed on an opposite side from the display surface 11DS side with respect to the liquid crystal panel 11. According to such a configuration, the first polarizing plate 12α having the polarizing plate alignment marks 15 is disposed on the opposite side from the display surface 11DS side with respect to the liquid crystal panel 11. Therefore, the polarizing plate alignment marks 15 are less likely to be seen by the user and the outer appearance and the display quality are improved.

The liquid crystal panel 11, the polarizing plate 12, and the backlight unit 13, which is the component, have a circular outline and the panel alignment marks 14, the polarizing plate alignment marks 15, and the backlight alignment marks 16 are included closer to the outer edge than the center of the liquid crystal panel 11, the polarizing plate 12, and the backlight unit 13, which is the component, respectively. According to such a configuration, compared to a configuration including the panel alignment marks, the polarizing plate alignment marks, and the backlight alignment marks closer to the center than the outer edge of the liquid crystal panel 11, the polarizing plate 12, and the backlight unit 13, which is the component, respectively, the alignment accuracy is further improved.

The liquid crystal panel 11 is defined into the display section AA displaying images thereon and the non-display section NAA surrounding the display section AA and including the outer edge of the liquid crystal panel 11. The panel alignment marks 14, the polarizing plate alignment marks 15, and the backlight alignment marks 16 are included in the non-display section NAA. According to such a configuration, each of the alignment marks is less likely to affect images displayed on the display section AA and the display quality is improved.

Second Embodiment

A second embodiment of the present technology will be described with reference to FIGS. 11 and 12. In the second embodiment, a second polarizing plate 112β includes polarizing plate alignment marks 115. Configurations, operations, and effects similar to those of the first embodiment will not be described.

Figure 11:
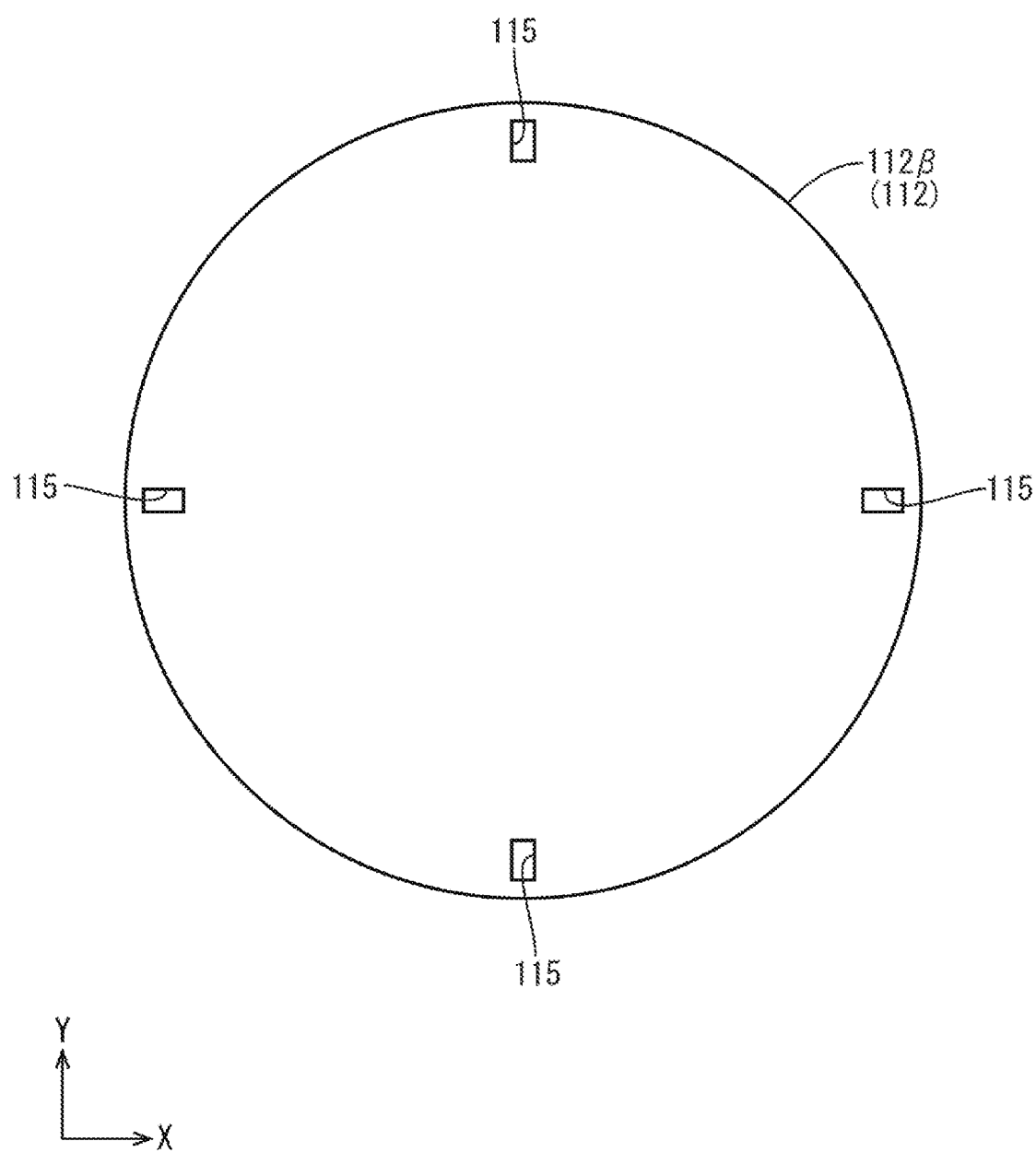
FIG. 11 is a plan view illustrating a second polarizing plate according to a second embodiment.
Figure 12:
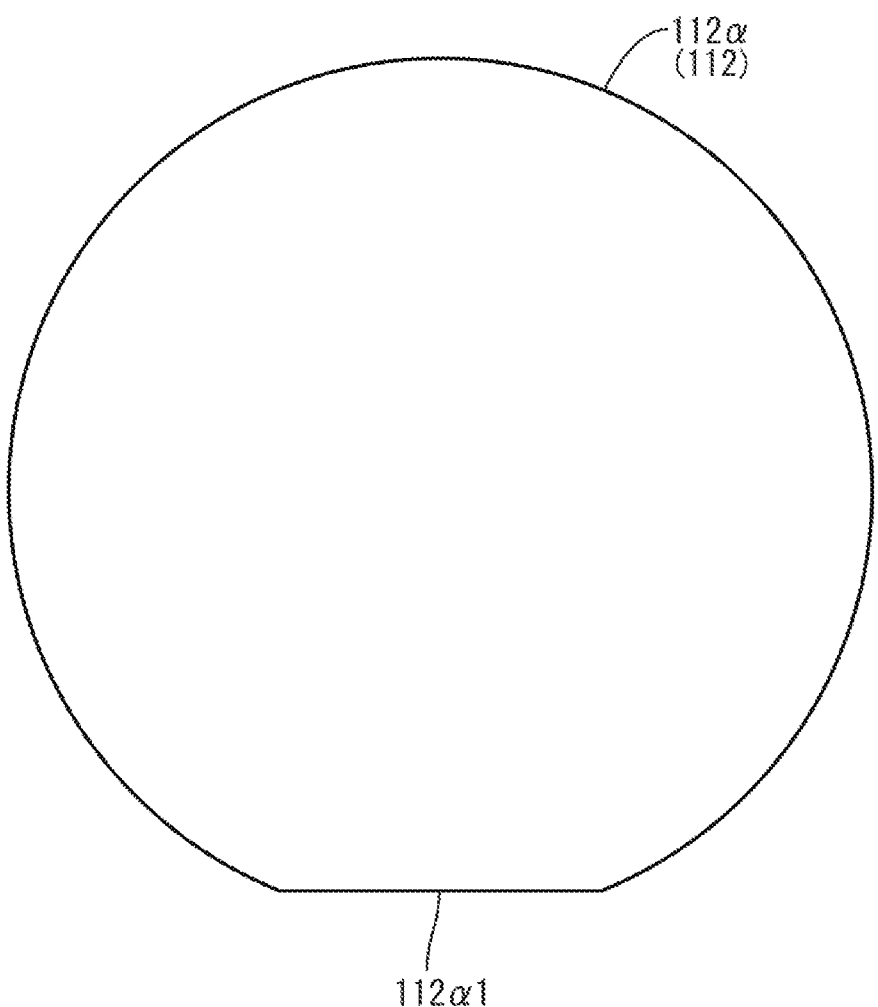
FIG. 12 is a plan view of a first polarizing plate.

FIG. 11 is a plan view of the second polarizing plate 112β. As illustrated in FIG. 11, the polarizing plate alignment marks 115 are included in a plate surface of the second polarizing plate 112β of a pair of polarizing plates 112. FIG. 12 is a plan view of a first polarizing plate 112α. As illustrated in FIG. 12, the first polarizing plate 112α does not include the polarizing plate alignment marks 115 and has a non-rotation symmetrical outline shape. Therefore, the first polarizing plate 112α is mounted on the liquid crystal panel, which is not illustrated, in a proper mounting position with using the outline shape thereof (a linear outline section 112α1). The second polarizing plate 112β is mounted on the liquid crystal panel in a proper mounting position based on position relation of the panel alignment marks, which are not illustrated, and the polarizing plate alignment marks 115.

Third Embodiment

A third embodiment of the present technology will be described with reference to FIGS. 13 to 16. In the third embodiment, a protection panel 17 is additionally included in the configuration of the first embodiment. Configurations, operations, and effects similar to those of the first embodiment will not be described.

Figure 13:
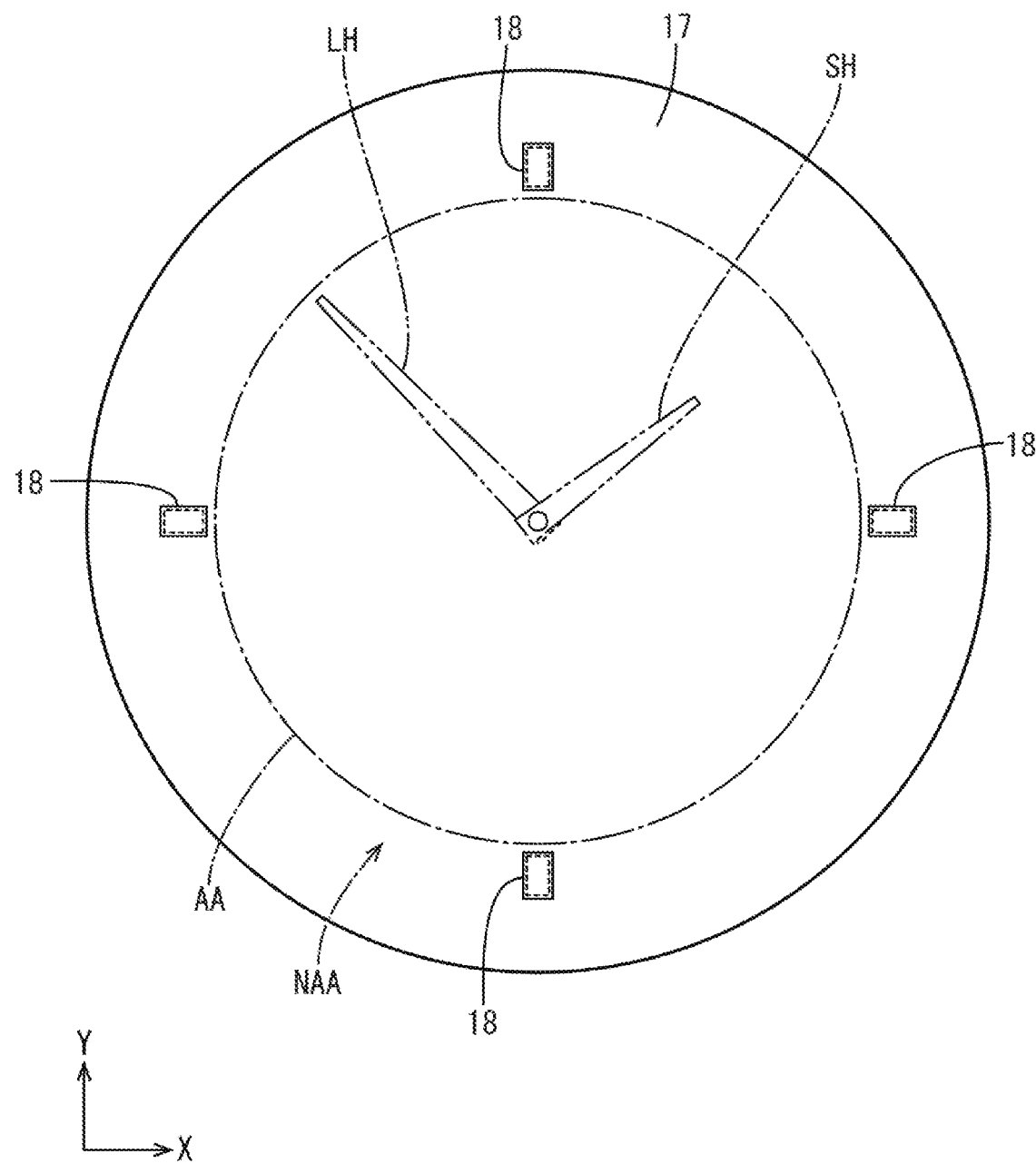
FIG. 13 is a plan view of a liquid crystal display device according to a third embodiment.
Figure 14:
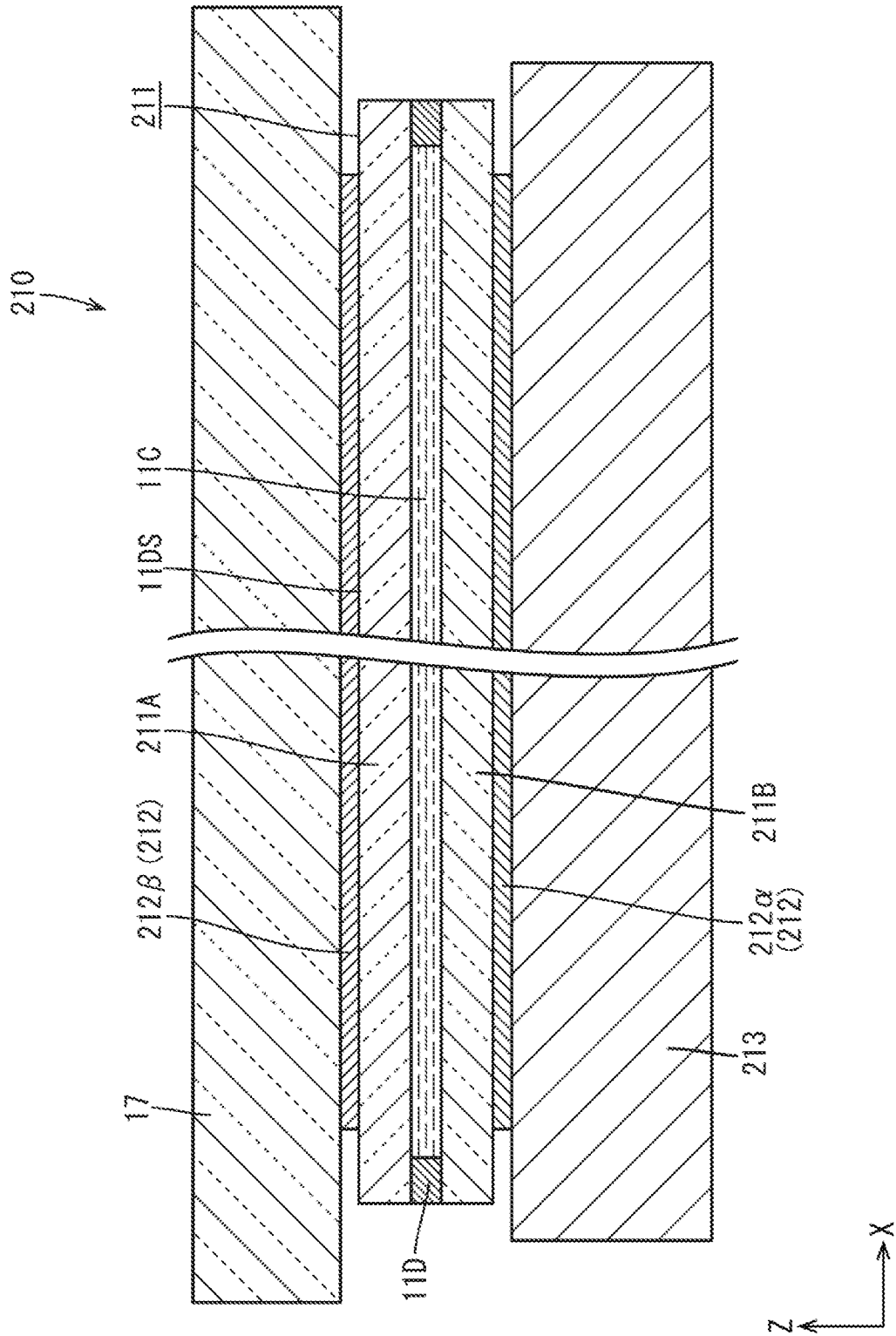
FIG. 14 is a cross-sectional view of the liquid crystal display device.

FIG. 13 is a plan view of a liquid crystal display device 210. FIG. 14 is a cross-sectional view of the liquid crystal display device 210. As illustrated in FIGS. 13 and 14, the liquid crystal display device 210 includes the protection panel 17 covering a liquid crystal panel 211 from outside and protecting it. An analog clock including a long hand LH and a short hand SH is illustrated with a two-dot chain line in FIG. 13 as an example of images displayed on the liquid crystal panel 211. The protection panel 17 has a substantially circular (non-quadrangular) plan view outline shape similar to the liquid crystal panel 211. The protection panel 17 has an outline that is slightly greater than or same as that of a backlight unit 213. The protection panel 17 is a plate made of substantially transparent glass having transmissivity and preferably made of tempered glass.

Figure 15:
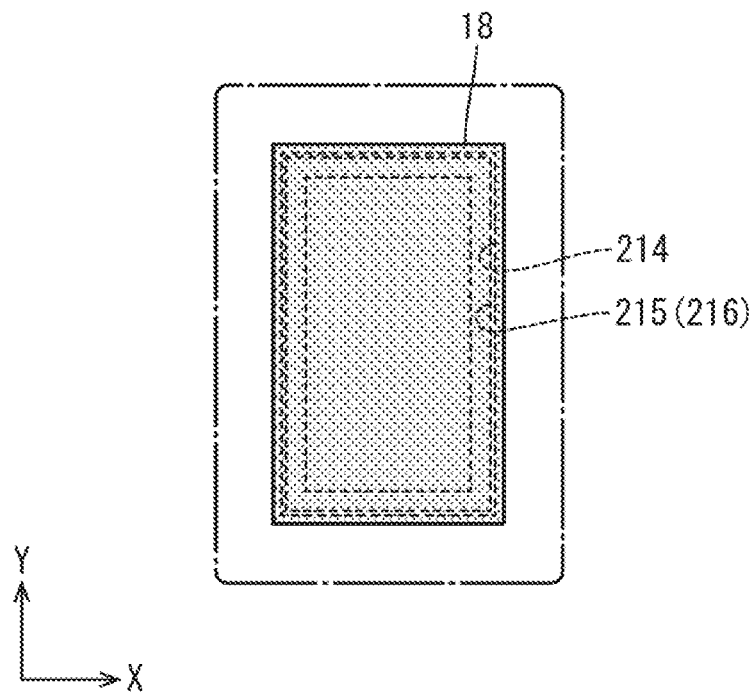
FIG. 15 is a plan view illustrating a panel alignment mark, a light blocking design member, a polarizing plate alignment mark, and a backlight alignment mark that match each other.

As illustrated in FIG. 13, light blocking design members 18 are included on a plate surface of the protection panel 17 as hour markers for the long hand LH and the short hand SH of the analog clock. The light blocking design members 18 are formed by disposing coating material having a light blocking property on a front side surface or a rear side surface of the protection panel 17. As another method of forming the light blocking design members 18, the protection panel 17 may be irradiated with a laser beam. The light blocking design members 18 are disposed overlapping the non-display section NAA and closer to an outer edge than a center of the protection panel 17. Four light blocking design members 18 are disposed at an angular interval of about 90° (at positions of three o'clock, six o'clock, nine o'clock, and twelve o'clock). The light blocking design member 18 has a plan view rectangular shape. FIG. 15 is a plan view illustrating that panel alignment marks 214, the light blocking design members 18, polarizing plate alignment marks 215, and backlight alignment marks 216 match each other. In FIG. 15, a forming area (a light blocking area) on the protection panel 17 where the light blocking design member 18 is formed is illustrated with shading. As illustrated in FIG. 15, the light blocking design member 18 overlaps the panel alignment mark 214 and the polarizing plate alignment mark 215 in a plan view. Accordingly, light that passes through the panel alignment mark 214 and the polarizing plate alignment mark 215 is blocked by the light blocking design member 18. Accordingly, outer appearance and display quality are improved. The light blocking design members 18 function as protection panel alignment marks (component alignment marks) for determining a mounting position of the protection panel 17 with respect to the liquid crystal panel 211 based on position relation of the light blocking design members 18 and the panel alignment marks 214. The present embodiment differs from the first embodiment in that each of the polarizing plates 212 includes the polarizing plate alignment marks 215.

Figure 16:
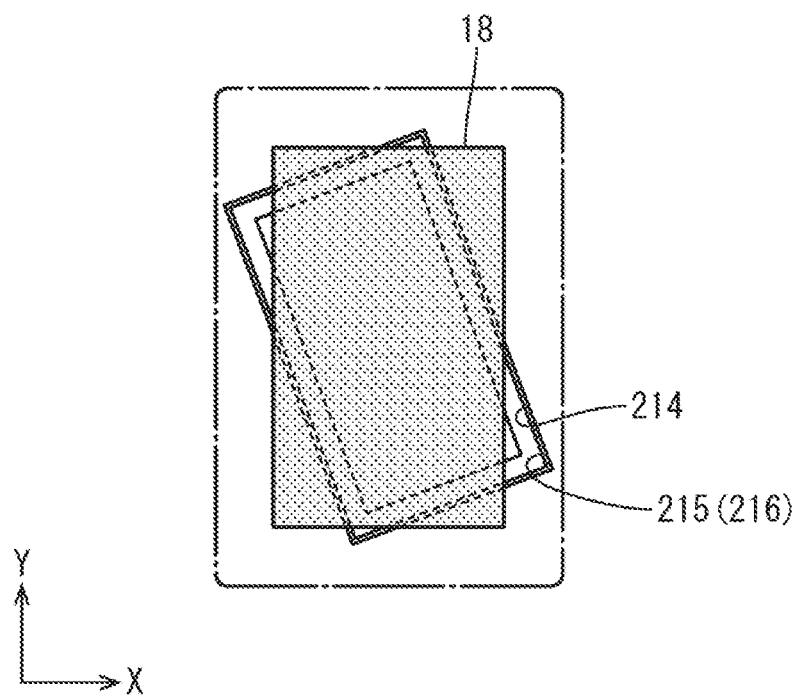
FIG. 16 is a plan view illustrating the panel alignment mark, the light blocking design member, the polarizing plate alignment mark, and the backlight alignment mark that do not match in a rotation direction.

Next, an operation of mounting the protection panel 17 on the liquid crystal panel 211 will be described. FIG. 16 is a plan view illustrating that the panel alignment mark 214, the light blocking design member 18, the polarizing plate alignment marks 215, and the backlight alignment mark 216 do not match each other in the rotation direction. In FIG. 16, a forming area (the light blocking area) on the protection panel 17 where the light blocking design member 18 is formed is illustrated with shading. The protection panel 17 is disposed on the front surface side of the liquid crystal panel 211 and the second polarizing plate 212β. In mounting the protection panel 17 having a rotational symmetrical outline shape illustrated in FIG. 13, the mounting position of the protection panel 17 with respect to the liquid crystal panel 211 can be determined based on the position relation of the light blocking design members 18 included in the plate surface of the protection panel 17 with respect to the panel alignment marks 214 included in the plate surface of the liquid crystal panel 211. For example, as illustrated in FIG. 15, if the outline of the panel alignment mark 214 and the outline of the light blocking design member 18 are parallel to each other and substantially match each other, it is determined that the mounting position of the protection panel 17 with respect to the liquid crystal panel 211 is normal. As illustrated in FIG. 16, if the outline of the light blocking design member 18 and the outline of the panel alignment mark 214 do not match in the rotation direction, it is determined that the mounting position of the protection panel 17 with respect to the liquid crystal panel 211 is shifted in a rotation direction. The arrangement of the panel alignment mark 214 and the light blocking design member 18 that do not match in the X-axis direction or the Y-axis direction is not illustrated in the drawings. Accordingly, the protection panel 17 is aligned with respect to the liquid crystal panel 211 based on the position relation of the light blocking design members 18 and the panel alignment marks 213 such that the protection panel 17 is mounted on the liquid crystal panel 211 in a proper position. Therefore, the alignment accuracy of protection panel 17 with respect to the liquid crystal panel 211 is improved. Each of a pair of polarizing plates 212 includes the polarizing plate alignment marks 215 and therefore, following operations are made. When the first polarizing plate 212α is mounted on the liquid crystal panel 211, the mounting position of the first polarizing plate 212α with respect to the liquid crystal panel 211 can be determined based on the position relation of the polarizing plate alignment marks 215 included in the first polarizing plate 212α and the panel alignment marks 214 included in the array substrate 211B. When the second polarizing plate 212β is mounted on the liquid crystal panel 211, the mounting position of the second polarizing plate 212β with respect to the liquid crystal panel 211 can be determined based on the position relation of the polarizing plate alignment marks 215 included in the second polarizing plate 212β and the panel alignment marks 214 included in the CF substrate 211A. Accordingly, the alignment accuracy of each of the polarizing plates in a pair with respect to the liquid crystal panel 211 is further improved.

As described before, according to this embodiment, the component at least includes the protection panel 17 that covers the liquid crystal panel 211 from outside and protects it. According to such a configuration, the mounting position of the protection panel 17, which is the component, is determined based on the position relation of the panel alignment marks 214 and the protection panel alignment marks. Accordingly, the alignment accuracy of the protection panel 17 with respect to the liquid crystal panel 211 is improved.

The protection panel 17 includes the light blocking design members 18 having a light blocking property. The light blocking design members 18 are disposed to overlap the respective panel alignment marks 214 and the respective polarizing plate alignment marks 215 and functions as the protection panel alignment marks (the component alignment marks). Accordingly, the mounting position of the protection panel 17 with respect to the liquid crystal panel 211 can be determined based on position relation of the panel alignment marks 214 and the light blocking design members 18 that function as the protection panel alignment marks. The light blocking design members 18 overlap the respective panel alignment marks 214 and the respective polarizing plate alignment marks 215. If light passes through the panel alignment marks 214 and the polarizing plate alignment marks 215, the light is blocked by the light blocking design members 18. Therefore, the outer appearance and the display quality are improved.

The polarizing plate 212 includes a pair of polarizing plates sandwiching the liquid crystal panel 211 therebetween and each of the pair of polarizing plates 212 includes the polarizing plate alignment marks 215. According to such a configuration, when the polarizing plates 212 are mounted on the liquid crystal panel 211, the mounting position of each of the polarizing plates 212 with respect to the liquid crystal panel 211 can be determined based on the position relation of the respective panel alignment marks 214 included in each of substrates 211A, 211B of the liquid crystal panel 211 and the respective polarizing plate alignment marks 215 included in each of the polarizing plates 212. Accordingly, the alignment accuracy of each of the polarizing plates 212 with respect to the liquid crystal panel 211 is improved.

Fourth Embodiment

A fourth embodiment of the present technology will be described with reference to FIG. 17. The fourth embodiment is altered from the third embodiment in that a reflection type liquid crystal panel 311 is used in the fourth embodiment. Configurations, operations, and effects similar to those of the first embodiment will not be described.

Figure 17:
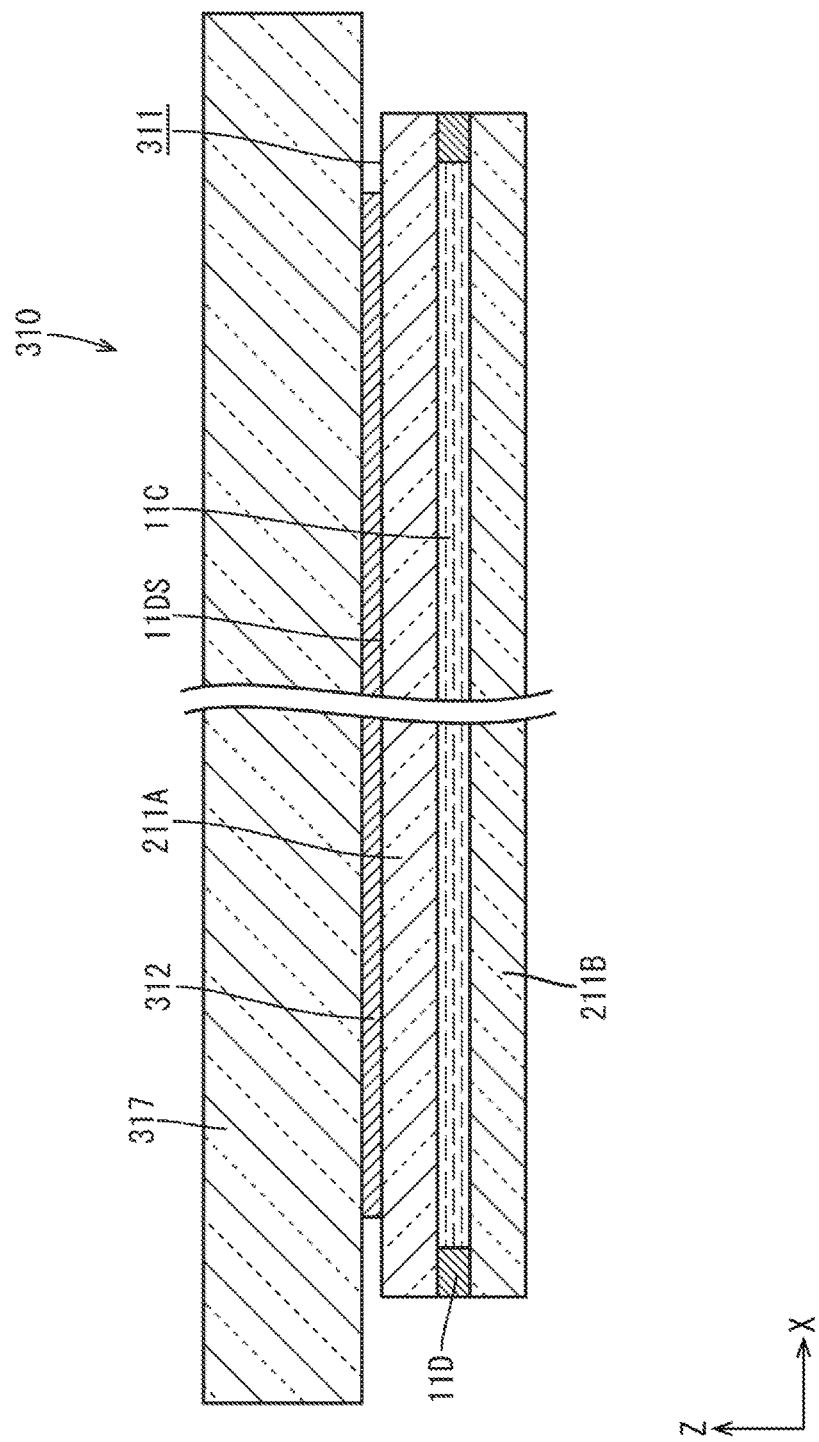
FIG. 17 is a cross-sectional view of a liquid crystal display device according to a fourth embodiment.

FIG. 17 is a cross-sectional view of a liquid crystal display device 310. A liquid crystal panel 311 is a reflection type liquid crystal panel that displays images with using external light. Therefore, as illustrated in FIG. 17, the liquid crystal display device 310 does not include a backlight unit as described in the third embodiment. A polarizing plate 312 is mounted only on a front side surface of the liquid crystal panel 311. With such a configuration, the mounting position of a protection panel 317 with respect to the liquid crystal panel 313 can be determined based on position relation of the panel alignment marks, which are not illustrated, and the light blocking design members.

Other Embodiments

The technology described herein is not limited to the embodiments described above with reference to the drawings and the following embodiments may be included in the technical scope.

(1) In each of the above embodiments, the panel alignment mark has a frame plan view shape. However, the panel alignment mark may have a quadrangular plan view shape similar to the polarizing plate alignment mark or the backlight alignment mark.

(2) In each of the above embodiments, each of the alignment marks has a similar plan view shape. However, each of the alignment marks may not have a similar plan view shape.

(3) Other than each of the above embodiments, the specific number, the specific arrangement, and the specific plan view shape of the alignment marks may be altered as appropriate.

(4) In the above (3), if the plan view shape of the alignment marks is altered, the plan view shape may be a polygonal shape such as a triangle, a quadrangle, or a pentagon, a circular shape such as an ellipse, symbols such as a star shape, a spade shape, or a clover shape, numbers, and characters. Other than the above ones, the alignment marks may have various plan view shapes.

(5) In the above (3), if the number of the alignment marks is altered, the number of the alignment marks may be three or less or may be five or more. In such a configuration, regarding planar arrangement of the alignment marks, it is preferable that the alignment marks are arranged at an angular interval of an angle other than 90°. However, it is not limited thereto. In altering the planar arrangement of the alignment marks, the arrangement angular intervals of the alignment marks may not be equal.

(6) In each of the above embodiments, the panel alignment marks and other alignment marks (the polarizing plate alignment marks, the backlight alignment marks, and the light blocking design members) overlap over substantially entire areas thereof with a plan view. However, the panel alignment mark and other alignment mark may partially overlap in a plan view or may not overlap.

(7) In each of the above embodiments, the openings (holes) formed in the polarizing plate are the polarizing plate alignment marks. However, the polarizing plate may include colored sections, recessed sections, or projected sections as the polarizing plate alignment marks.

(8) In each of the above embodiments, the openings (holes) formed in the optical member of the backlight unit are the backlight alignment marks. However, the optical member may include colored sections, recessed sections, or projected sections as the backlight alignment marks.

(9) In each of the above embodiments, the backlight unit and the protection panel are mounted on the liquid crystal panel in addition to the polarizing plate. The liquid crystal panel may include a touch panel as the component other than the backlight unit or the protection panel. In such a configuration, the touch panel may include touch panel alignment marks (the component alignment marks).

(10) In each of the above embodiments, the outline shape of the liquid crystal panel, the polarizing plate, the backlight unit, and the protection panel is a circular shape. Other than that, the outline shape of the liquid crystal panel, the polarizing plate, the backlight unit, and the protection panel may be an ellipsoidal shape.

(11) In each of the above embodiments, the counter electrode is included on the CF substrate of the liquid crystal panel. However, a common electrode may be included on the array substrate instead of the counter electrode on the CF substrate. In such a configuration, an operation mode of the liquid crystal panel is preferably a FFS mode.

(12) In each of the above embodiments, the pair of polarizing plates is arranged in a crossed nicols arrangement and the liquid crystal panel is in a normally black mode. However, a pair of polarizing plate may be arranged in a parallel nicols arrangement and the liquid crystal panel may be in a normally white mode.

(13) In each of the above embodiments, the liquid crystal display device includes the liquid crystal panel of a transmission type or a reflection type. However, a liquid crystal display device including a transflective liquid crystal panel may be included in the technical scope.

(14) In each of the above embodiments, the liquid crystal panel is used as the display panel. However, a display panel of micro electro mechanical systems (MEMS) may be used. In such a configuration, the backlight unit is required similarly to the first to third embodiments.

(15) In each of the above embodiments, the liquid crystal panel is used as the display panel. However, an organic EL panel may be used as the display panel. In such a configuration, the backlight unit is not required similarly to the fourth embodiment.

(16) In each of the above embodiments, the liquid crystal display device used in wearable terminals are described. However, the liquid crystal display device may be used in a head-mounted display or a head-up display. Other than that, a liquid crystal display device used in on-vehicle terminals (a car navigation system) or a liquid crystal display device used in a radar detector or a meter display of a vehicle may be included in the technical scope.

The invention claimed is:

1. A display device comprising:
a display panel displaying an image thereon and including a plate surface and a panel alignment mark on the plate surface of the display panel;
a polarizing plate overlapping the plate surface of the display panel and including a polarizing plate alignment mark; and
a component overlapping the plate surface of the display panel and the polarizing plate and including a component alignment mark, wherein
the display panel, the polarizing plate, and the component have a non-quadrangular outline shape,
a mounting position of the polarizing plate with respect to the display panel is determined according to a position relation of the polarizing plate alignment mark and the panel alignment mark,
a mounting position of the component with respect to the display panel is determined according to a position relation of the component alignment mark and the panel alignment mark, and
an outline of the panel alignment mark, an outline of the polarizing plate alignment mark, and an outline of the component alignment mark are aligned with each other in a plan view.

2. The display device according to claim 1, wherein the component at least includes a backlight that supplies light to the display panel for display.

3. The display device according to claim 2, wherein
the backlight includes a light source, a plate surface parallel to the plate surface of the display panel, and an optical member that applies an optical action to light from the light source, and
the component alignment mark includes an opening in the plate surface of the optical member.

4. The display device according to claim 1, wherein the component at least includes a protection panel that covers the display panel from outside and protects the display panel.

5. The display device according to claim 4, wherein
the protection panel includes a light blocking design member having a light blocking property, and the light blocking design member overlaps the panel alignment mark and the polarizing plate alignment mark and functions as the component alignment mark.

6. The display device according to claim 1, wherein the display panel includes a pair of substrates that are bonded to each other, and the panel alignment mark is included in each of the substrates.

7. The display device according to claim 6, wherein the polarizing plate includes a pair of polarizing plates that sandwich the display panel therebetween, and the polarizing plate alignment mark is included in each of the polarizing plates.

8. The display device according to claim 1, wherein the polarizing plate includes a pair of polarizing plates that sandwich the display panel therebetween, and the polarizing plates include a first polarizing plate having the polarizing plate alignment mark and a second polarizing plate having a non-quadrangular outline shape and a non-rotation symmetrical shape.

9. The display device according to claim 8, wherein the display panel includes a display surface on the plate surface on which an image appears, and the first polarizing plate is disposed on an opposite side from the display surface with respect to the display panel.

10. The display device according to claim 1, wherein the display panel, the polarizing plate, and the component have a circular outline shape, and the panel alignment mark, the polarizing plate alignment mark, and the component alignment mark are included closer to an outer edge than a center of the display panel, the polarizing plate, and the component, respectively.

11. The display device according to claim 1, wherein the display panel is defined into a display section displaying images thereon and a non-display section surrounding the display section and including an outer edge of the display panel, and the panel alignment mark, the polarizing plate alignment mark, and the component alignment mark are included in the non-display section.

* * * * *